United States Patent
Itoh et al.

(10) Patent No.: US 6,905,437 B2
(45) Date of Patent: Jun. 14, 2005

(54) POWER ROLLER BEARING OF TOROIDAL-TYPE CONTINUOUSLY VARIABLE TRANSMISSION UNIT

(75) Inventors: Hiroyuki Itoh, Fujisawa (JP); Takashi Imanishi, Yokohama (JP); Nobuo Goto, Fujisawa (JP); Yasuo Murakami, Hadano (JP); Tomonobu Yoshikawa, Yamato (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 10/412,798

(22) Filed: Apr. 11, 2003

(65) Prior Publication Data

US 2003/0181287 A1 Sep. 25, 2003

Related U.S. Application Data

(63) Continuation of application No. 09/972,234, filed on Oct. 5, 2001, now abandoned, which is a continuation-in-part of application No. PCT/JP00/02201, filed on Apr. 5, 2000.

(30) Foreign Application Priority Data

Apr. 6, 1999 (JP) .......................................... 11-098841
Apr. 6, 1999 (JP) .......................................... 11-098842

(51) Int. Cl.[7] .......................... F16H 15/38; F16C 33/58
(52) U.S. Cl. ............................. 476/73; 476/40; 384/516
(58) Field of Search ................................. 384/513, 516; 476/40, 42, 46, 73

(56) References Cited

U.S. PATENT DOCUMENTS

| | | | |
|---|---|---|---|
| 3,198,735 A | 8/1965 | Lamson et al. | |
| 3,843,962 A | 10/1974 | Bogue | |
| 4,258,084 A * | 3/1981 | Hayden, Sr. | 427/239 |
| 5,520,987 A * | 5/1996 | Narai et al. | 428/141 |
| 5,735,769 A * | 4/1998 | Takemura et al. | 476/40 |
| 6,174,257 B1 * | 1/2001 | Imanishi et al. | 476/40 |

FOREIGN PATENT DOCUMENTS

| | | |
|---|---|---|
| DE | 198 29 631 A1 * | 2/1999 |
| EP | 0 877 175 | 11/1998 |
| JP | 63-126618 | 8/1988 |
| JP | 3-199716 | 8/1991 |
| JP | 5-195069 | 8/1993 |
| JP | 7-71555 | 3/1995 |
| JP | 7-208568 | 8/1995 |
| JP | 9-229074 | 9/1997 |
| JP | 11-62950 | 3/1999 |

OTHER PUBLICATIONS

International Search Report.

* cited by examiner

*Primary Examiner*—William C Joyce
(74) *Attorney, Agent, or Firm*—Christensen O'Connor Johnson Kindness PLLC

(57) ABSTRACT

A power roller bearing of a toroidal-type continuously variable transmission unit that is used for a transmission of an automobile or the like comprises a power roller, an outer race, balls, a retainer, etc. Annular raceway grooves are formed individually on the respective opposite end faces of the outer race and the power roller. Treated-surface layers for enhancing the endurance of the power roller bearing are formed individually on the respective surfaces of the raceway grooves. The treated-surface layers include super-finished surfaces with the surface roughness of 0.05 Rad or less, formed individually on the raceway grooves, and low-friction layers formed individually on the super-finished surfaces. Alternatively, the treated-surface layers include residual compression stress layers formed on the respective surface layer portions of the raceway grooves by shot-preening.

1 Claim, 5 Drawing Sheets

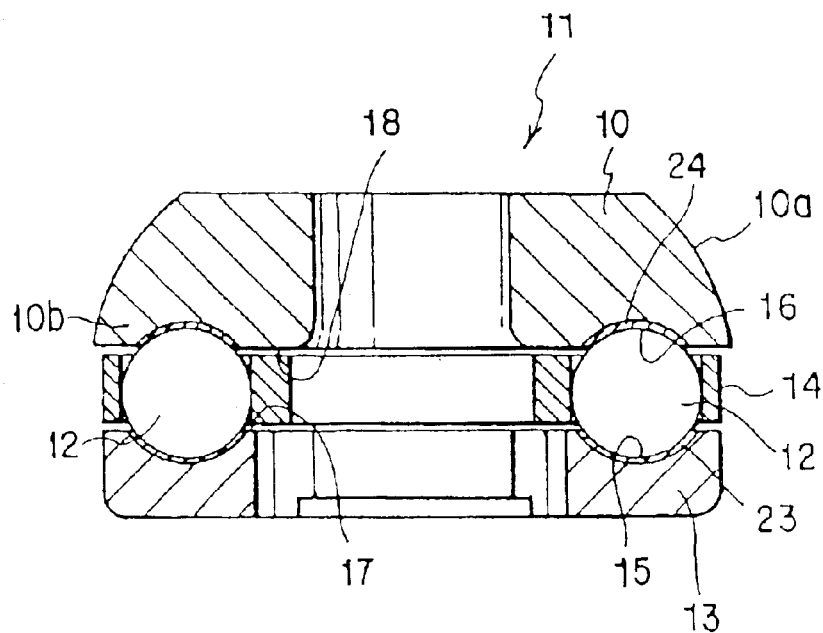
FIG. 2
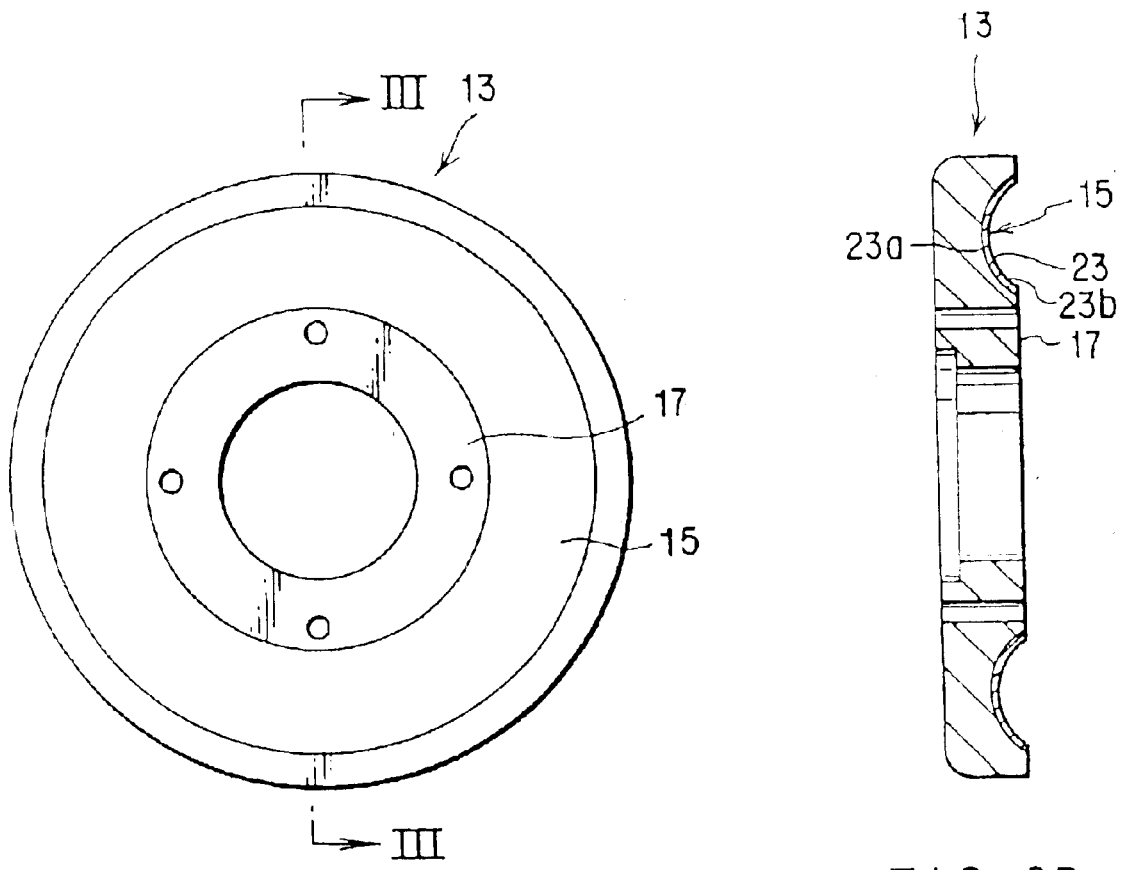
FIG. 3A
FIG. 3B

POWER ROLLER BEARING OF TOROIDAL-TYPE CONTINUOUSLY VARIABLE TRANSMISSION UNIT

CROSS-REFERENCES TO RELATED APPLICATIONS

This is a Continuation application of U.S. patent application Ser. No. 09/972,234, filed Oct. 5, 2001, now abandoned which is a Continuation application of PCT Application No. PCT/JP00/02201, filed Apr. 5, 2000, which was not published under PCT Article 21(2) in English, which claims the benefit of priority from prior Japanese Patent Application No. 11-098841, filed Apr. 6, 1999, and prior Japanese Patent Application No. 11-098842, filed Apr. 6, 1999. The entire contents of the above identified applications are hereby incorporated by reference.

FIELD OF THE INVENTION

The present invention relates to a power roller bearing of a toroidal-type continuously variable transmission unit adapted to be used for a transmission of, for example, an automobile, general industrial machine, transportation equipment, etc.

BACKGROUND OF THE INVENTION

A toroidal-type continuously variable transmission unit adapted to be used for a transmissions of, for example, an automobile, general industrial machine, transportation equipment, etc. comprises an input disc and an output disc opposed to each other, a power roller provided between the input and output discs, a loading cam mechanism for pushing the input and output discs toward each other, etc.

The input disc can be rotated by means of a drive source such as an engine. Power that is based on the rotation of the input disc is transmitted to the output disc through the power roller. The power roller is provided for swinging motion between the input disc and the output disc. The power roller is provided with traction portions that are in rolling contact with the two discs, individually. The power roller is rotatably supported by means of a power roller bearing that functions as a thrust bearing.

The power roller bearing is provided with an end portion of the power roller that functions as an inner race, an outer race, balls provided for rolling motion between the outer race and the power roller, etc. The power roller is supported for swinging motion between the input disc and the output disc by means of a trunnion. The gear ratio of the toroidal-type continuously variable transmission unit can be changed by changing the angle of inclination of the power roller.

A power roller bearing constructed in this manner resembles a conventional thrust ball bearing that is used to support a rotating shaft on which thrust load acts except for the arrangement of the power roller. Accordingly, a study has been made to produce power roller bearings at low cost by using parts that are designed for existing thrust ball bearings.

Although a power roller bearing resembles a thrust ball bearing, its power roller functions quite differently from the inner race of the conventional thrust ball bearing. More specifically, the distribution of load that acts on the power roller itself and the behavior of the balls in contact with the outer race and the power roller considerably differ from those of the conventional thrust ball bearing, so that improvement must inevitably be made in consideration of those differences.

While the inner race of the conventional thrust ball bearing is a member that simply supports a shaft, for example, the power roller functions as a power transmitting member for transmitting torque from the input disc to the output disc. This power roller is equivalent to a transmission gear in a gear-type multistage transmission. The power roller of this type rotates at high speed under heavy forces of pressure from the input disc and the output disc, so that it generates intense heat. The heat from the power roller serves to heat the balls and the like. Thus, it is essential to use high-viscosity traction oil, which is developed for the purpose of power transmission, as lubricating oil to be supplied between the outer race and the power roller.

The traction portions of the power roller that touch the input disc and the output disc face each other at a circumferential distance of 180° on the outer peripheral edge of the power roller. The heavy forces of pressure from the input disc and the output disc intensively act on the traction, portions of the power roller as a resultant force that combines radial load and thrust load. Thus, a very high contact pressure develops in the traction portions of the power roller that touch the input disc and the output disc.

A conventional bearing is used under a contact pressure of 2 to 3 GPa (gigapascals) or less, for example. In the case of a power roller bearing that is used in a toroidal-type continuously variable-transmission unit for a vehicle, on the other hand, the contact pressure ranges from 2.5 to 3.5 GPa in a normal deceleration mode. In some cases, the contact pressure may even reach 4 GPa in a maximum deceleration mode.

Further, the heavy forces of pressure from the input disc and the output disc intensively act as a radial load in positions at a distance of 180° from each other on the traction portions of the power roller. This radial load causes the power roller to undergo compressive deformation in the radial direction. Since this compressive deformation causes the power roller to warp, it is hardly possible to allow a plurality of balls between the power roller and the outer race uniformly to share thrust load that acts on the power roller. Thrust load that acts on these balls increases in positions at an angular distance of 90° from the positions of contact (traction portions of the power roller) between the power roller and the input and output discs. In consequence, pressures of contact between the individual balls and raceway grooves vary, so that some of the balls roll in the raceway grooves under very high contact pressures.

In order to prevent high contact pressures from lowering the life performance, it is essential specially to adjust the materials, surface hardness, and surface roughness of the traction portions of the power roller in contact with the input and output discs and the respective raceway grooves of the power roller and the outer race that are touched by the balls.

In order to lengthen the life of the power roller bearing, based on this background, the applicant hereof proposed a technique in which balls are formed of medium-carbon steel or high-carbon steel and the hardness and strength of the ball surface are adjusted by carburizing-nitriding treatment or quenching and tempering treatments (see Jpn. Pat. Appln. KOKAI Publication No. 7-208568).

The applicant hereof also proposed a technique in which an input disc, an output disc, and a power roller in contact with them are subjected to ground finish after they are subjected to carburizing treatment. Further, the applicant hereof proposed a technique in which input and output discs and a power roller are subjected to ground finish after they are subjected to carburizing-nitriding treatment so that the hardness and effective case depth of the respective surfaces of these members can be adjusted to appropriate values (2 mm to 4 mm) that stand locally high contact pressures (see Jpn. Pat. Appln. KOKAI Publication No. 7-71555).

Although the hardness, effective case depth, and surface roughness of the power roller and balls are rationalized by using traction oil for power roller bearings, use of appropriate materials for the individual members, and surface treatments, as mentioned before, the endurance of the power roller bearing can be improved only a limited amount.

In some cases, the molecular structure of the traction oil, synthetic oil, may be decomposed as the power roller is heated, in particular. In these cases, the traction coefficient worsens, and the safety factor for gloss slip also lowers. If the traction oil is degenerated, moreover, it is hard to form oil films on the respective surfaces of the power roller, balls, etc. Accordingly, there is a possibility of the traction portions of the power roller and the surfaces of the respective raceway grooves of the power roller and the outer race undergoing early flaking. These phenomena cause the life performance of the power roller bearing to lower.

Since the power roller bearing is originally designed for power transmission, it is important to minimize loss of the dynamic torque of the bearing itself, thereby improving the torque transmissibility. Despite the aforesaid improvement, however, a substantial dynamic torque loss may be caused to lower the torque transmissibility, depending on the dimensions of the balls and the respective raceway grooves of the power roller and the outer race. If the hardness and effective case depth of the respective surfaces of the power roller and the like are adjusted in the aforesaid manner, moreover, the edges of the raceway grooves or the balls sometimes may be broken early, or the respective contact surfaces of the raceway grooves and the balls may be marred, so that the life performance of the power roller bearing may be lowered.

Accordingly, the object, of the present invention is to provide a power roller bearing of a toroidal-type continuously variable transmission unit, of which the life performance can be restrained from lowering.

SUMMARY OF THE INVENTION

A power roller bearing of a toroidal-type continuously variable transmission unit of the present invention is provided for swinging motion between an input disc capable of being rotated by means of a drive source and an output disc opposed to the input disc, and comprises an outer race, a power roller in rolling contact with the input disc and output disc, and balls provided for rolling motion between the outer race and the power roller, the outer race and the power roller having annular raceway grooves in which the balls roll individually, at least one of the respective raceway grooves of the outer race and the power roller being formed having treated-surface layers for enhancing the endurance thereof.

The treated-surface layers based on a first aspect of the present invention include super-finished surfaces with the surface roughness of 0.05 Ra or less, formed on both the respective raceway grooves of the outer race and the power roller, and low-friction layers formed on at least one of the super-finished surfaces.

According to this invention, heat generated in the power roller bearing can be reduced by lessening friction that is produced as the balls roll in the respective raceway grooves of the outer race and the power roller. Thus, the respective surfaces of the raceway grooves are not liable to flaking, so that the life of the power roller bearing can be lengthened. According to this invention, the dynamic torque of the power roller bearing is lessened, and the general power transmission efficiency of the toroidal-type continuously variable transmission unit is improved. If the transmission unit is applied to an automobile, therefore, the fuel consumption ratio can be improved at the same time.

Preferably, the low-friction layers are formed of lubricative substances including at least one material selected from the group including gold, silver, lead, molybdenum disulfide ($MoS_2$), tungsten disulfide ($WS_2$), and fluoroplastics. Among these substances, some of the lubricative substances including gold, silver, lead, or fluoroplastic, are gradually scraped from the low-friction layers by means of frictional force that is produced as the bearing rotates. As the particles of the scraped lubricative substances are transferred to a fellow surface that is touched by the balls, thin films of the lubricative substances are formed on the fellow surface, whereby the bearing is lubricated. Since layers of molybdenum disulfide and tungsten disulfide as the lubricative substances have their own lubricative surfaces, these lubricative surfaces wear little by little as they develop lubricating properties. The layer of molybdenum disulfide or tungsten disulfide is formed on the surface of each ball or the surface of the raceway groove of the power roller or the outer race by sputtering. According to the power roller bearing using these low-friction layers, heat can be restrained more securely, so that the life of this bearing can be lengthened.

In order to achieve the above object, the treated surface layers of the power roller bearing of the present invention based on a second aspect include residual compression stress layers formed by shot-preening on at least one of the respective raceway grooves of the outer race and the power roller. These residual compression stress layers serve to ease stress that is generated as the balls roll in the raceway grooves. Thus, the fatigue life of the power roller bearing can be improved.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a sectional view showing a power roller bearing of the same embodiment;

FIG. 3A is a plan view of an outer race of the power roller bearing of the same embodiment;

FIG. 3B is a sectional view of the outer race taken along line III—III of FIG. 3A;

DETAILED DESCRIPTION OF THE PREFERRED EMBODIMENT (First Embodiment)

A first embodiment of the present invention will now be described with reference to FIGS. 1 to 5.

Figure 1:
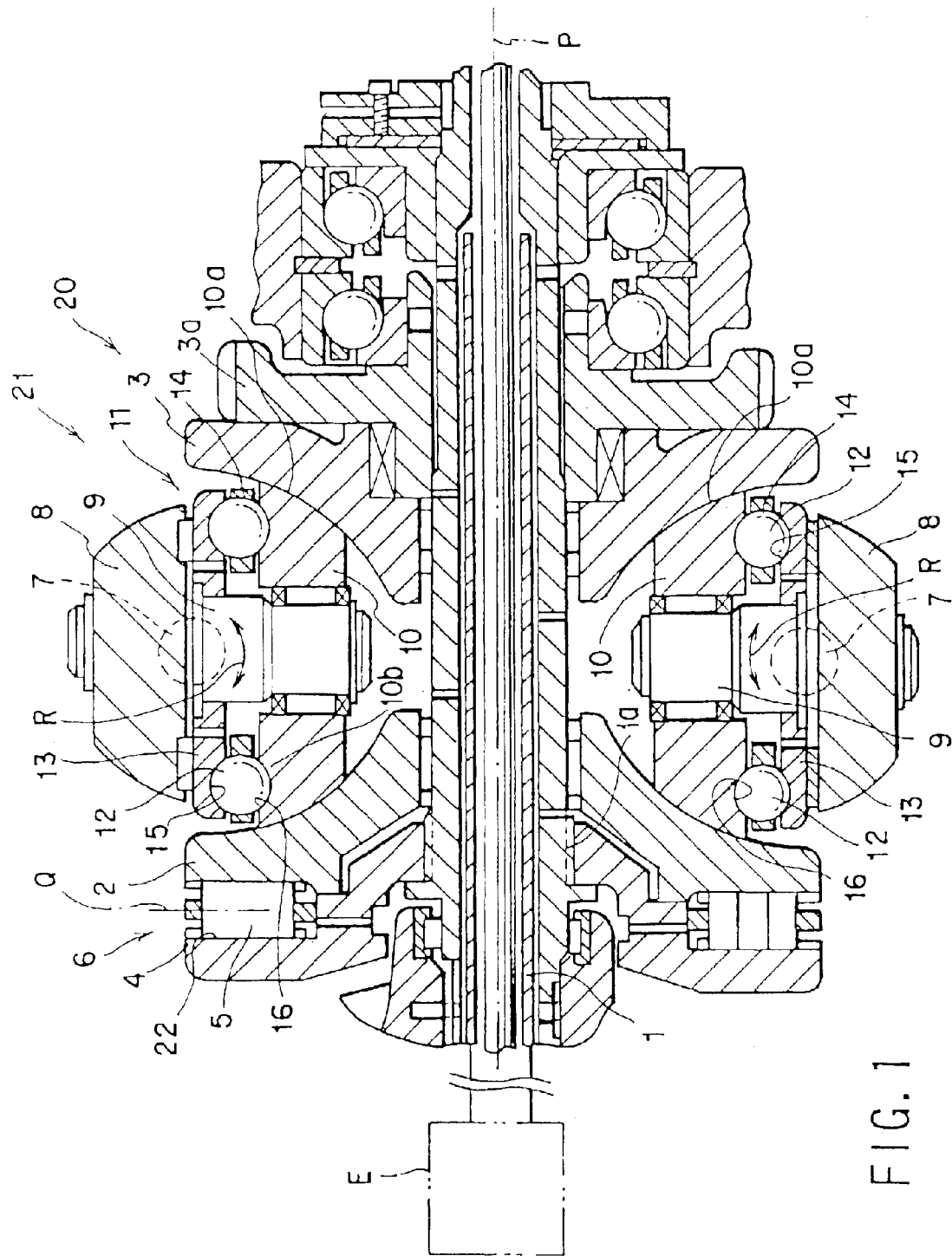
FIG. 1 is a longitudinal sectional view showing a part of a single-cavity half-toroidal-type continuously variable transmission unit according to a first embodiment of the present invention.

FIG. 1 is a partial sectional view of an automotive transmission 21 that uses a single-cavity half-toroidal-type continuously variable transmission unit 20 as an example of a toroidal-type continuously variable transmission unit. FIG. 2 is a sectional view of a power roller bearing 11 that functions as a thrust bearing of the toroidal-type continuously variable transmission unit 20.

As shown in FIG. 1, the single-cavity half-toroidal-type continuously variable transmission unit 20 that is used in the transmission 21 comprises an input shaft 1 capable of being rotated by means of a drive source E that includes an engine or the like, an input disc 2, an output disc 3, a power roller 10, and a loading cam mechanism 6 for use as push means.

The input disc 2 is supported on the input shaft 1 and can rotate in association with the input shaft 1. The output disc 3 is rotatably supported on the input shaft 1 so as to face the input disc 2. The, output disc 3 can rotate integrally with an output transmitting member 3a for fetching power that is based on the rotation of the input-shaft 1. This output transmitting member 3a can rotate in association with an output shaft (not shown).

The power roller 10 is provided for swinging motion between the input disc 2 and the output disc 3, and is in rolling contact with both the discs 2 and 3. The loading cam mechanism 6 is located on the backside of the input disc 2.

The loading cam mechanism 6 is provided with a cam disc 4 and a cam roller 5. The cam disc 4 rotates integrally with the input shaft 1 in a manner such that it is fitted on a spline portion 1a that is formed on the input shaft 1. A cam face 22 that is formed of a circumferential recess and projection are formed on that surface of the cam disc 4 which faces the input disc 2. The cam disc 4 can rotates in association with the drive source E.

The cam roller 5 is located between the cam disc 4 and the input disc 2. The cam roller 5 is provided for rotation around an axis Q in the radial direction with respect to an axis P of the input shaft 1. A plurality of cam rollers 5 are arranged around the axis P of the input shaft 1.

When the cam disc 4 is rotated by means of the drive source E that includes the engine, in the loading cam mechanism 6 with the configuration described above, the cam rollers 5 is pushed toward the input disc 2 by means of the cam face 22. Then, the input disc 2 is pushed toward the output disc 3 by means of the cam rollers 5. A push force generating mechanism such as a hydraulic piston may be used in place of the loading cam mechanism 6 that functions as the push means.

A trunnion 8 is provided between the input disc 2 and the output disc 3. The trunnion 8 can swing around a pivot 7 in the direction indicated by arrow R in FIG. 1. A displacement shaft 9 is provided in the central portion of the trunnion 8. The power roller 10 is rotatably supported on the displacement shaft 9.

The power roller 10 includes a traction portion 10a that is in rolling contact with the input disc 2 and the output disc 3. Between the input disc 2 and output disc 3, the power roller 10 changes its angle of inclination in accordance with the gear ratio of the toroidal-type continuously variable transmission unit 20. An end portion 10b of the power roller 10 functions as an inner race of the power roller bearing 11, which will be mentioned later.

The power roller bearing 11 for use as a thrust bearing is provided between the trunnion 8 and the power roller 10. As shown in FIG. 2, the power roller bearing 11 is provided with the end portion 10b of the power roller 10 that serves as the inner race, an outer race 13, a plurality of balls 12 as rolling elements, and a retainer 14.

As shown in FIG. 3A, the outer race 13 has an annular shape. The outer race 13 is supported on the trunnion 8. The balls 12 have a spherical shape each. The balls 12 are arranged individually for rolling motion between the power-roller 10 and the outer race 13. The retainer 14, which has an annular shape, is located between the outer race 13 and the power roller 10. The retainer 14 holds the balls 12 for rolling motion.

The power roller bearing 11 with the aforementioned configuration is provided for swinging motion between the input disc 2 and the output disc 3. When the input disc 2 is pushed toward the output disc 3 by means of the loading, cam mechanism 6, the turning force of the input disc 2 that is rotated by means of the drive source E is transmitted to the output disc 3 through the power roller 10. As the output transmitting member 3a rotates integrally with the output disc 3, the rotation of the input disc 2 is fetched as power.

Since the loading cam mechanism 6 pushes the input disc 2 toward the output disc 3 in the aforesaid manner so that the power roller 10 comes into rolling contact with both the input and output discs 2 and 3, load in the thrusting direction acts on the power roller 10. The power roller bearing 11 supports the load in the thrusting direction the input disc 2 and the output disc 3 apply to the power roller 10, and allows the power roller 10 to rotate.

Figure 4A:
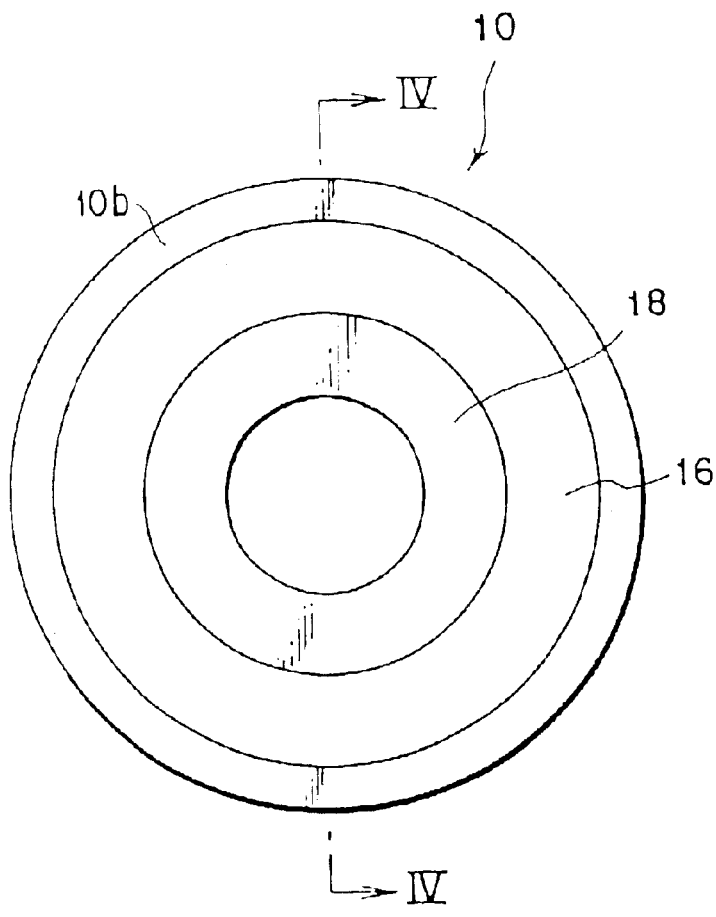
FIG. 4A is a plan view of a plan view of a power roller of the power roller bearing of the same embodiment.
Figure 4B:
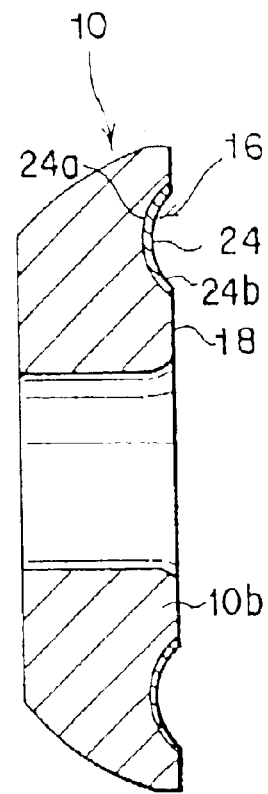
FIG. 4B is a sectional view of the power roller taken along line IV—IV of FIG. 4A.

As shown in FIGS. 3A and 3B, a raceway groove 15 is formed on an end face 17 of the outer race 13. As shown in FIGS. 4A and 4B, a raceway groove 16 is formed on an end face 18 of the power roller 10 in a position opposite to the raceway groove 15 of the outer race 13. The raceway grooves 15 and 16 are formed like rings on their corresponding end faces 17 and 18. As shown in FIGS. 3B and 4B, the raceway grooves 15 and 16 have an arcuate cross section each.

Figure 5:
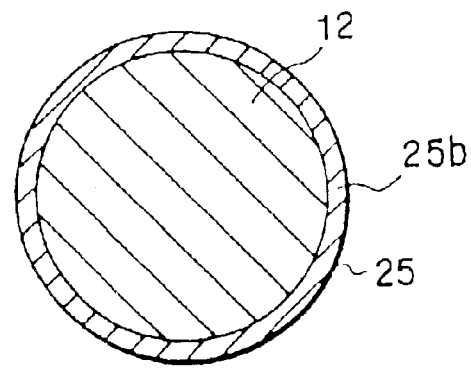
FIG. 5 is a sectional view showing a ball of the power roller bearing of the same embodiment.

Base materials that individually constitute the outer race 13 and the power roller 10 have superfinished surfaces 23a and 24a that are formed by superfinishing the respective surfaces of the raceway grooves 15 and 16. The surface roughness of these super-finished surfaces 23a and 24a is adjusted to 0.05 Rad or less. Low-friction layers 23b and 24b are formed on the super-finished surfaces 23a and 24a, respectively. The super-finished surfaces 23a and 24a and the low-friction layers 23b and 24b constitute treated-surface layers 23 and 24. As shown in FIG. 5, a treated-surface layer 25 including a low-friction layer 25b is formed also on the surface of each ball 12. These low-friction layers 23b, 24b and 25b are formed individually of lubricative substances selected from at least one of the materials of a group including gold, silver, lead, molybdenum disulfide ($MoS_2$), tungsten disulfide ($WS_2$), and fluoroplastics. In the low-friction layers 23b, 24b and 25b that are formed of lubricative substances including gold, silver, lead, and fluoroplastics, among those substances, their lubricative substances are gradually scraped from the respective surfaces of the base materials as the power roller bearing 11 rotates. As the particles of the scraped lubricative substances are transferred to a fellow surface that is touched by the balls 12, thin films of the lubricative substances are formed also on the fellow surface. The films of these lubricative substances serve to lubricate the power roller bearing 11.

Since films of molybdenum disulfide and tungsten disulfide have their own lubricative surfaces, these lubricative surfaces wear little by little as they develop lubricating properties. The films of molybdenum disulfide and tungsten disulfide are formed on the respective surfaces of the balls 12 and the raceway grooves 15 and 16 by sputtering.

According to the arrangement described above, the super-finished surfaces 23a and 24a with the surface roughness of 0.05 Rad or less are formed on the respective raceway grooves 15 and 16 of the outer race 13 and the power roller 10, and the low-friction layers 23b and 24b of molybdenum disulfide or the like are further formed on the super-finished surfaces. The low-friction layer 25b is formed also on the surface of each ball 12. Accordingly, the value of heat developed as the balls 12 roll in the raceway grooves 15 and 16 can be lowered. Thus, the respective surfaces of the raceway grooves 15 and 16 are not liable to flaking, so that the life of the power roller bearing 11 of the toroidal-type continuously variable transmission unit 20 can be lengthened.

In the embodiment described above, the low-friction layers 23b and 24b are formed on both the raceway groove 15 of the outer race 13 and the raceway groove 16 of the power roller 10. Alternatively, however, the low-friction layer 23b or 24b may be formed on one of the raceway grooves 15 and 16. In this case, the life of the power roller bearing 11 can be also lengthened. Thus, lowering of the life performance of the power roller bearing 11 of the toroidal-type continuously variable transmission unit 20 can be restrained by forming the low-friction layer 23b or 24b on at least one of the respective raceway grooves 15 and 16 of the outer race 13 and the power roller 10.

According to the present invention, the dynamic torque of the power roller bearing 11 is lessened, and the general power transmission efficiency of the toroidal-type continuously variable transmission unit 20 is improved. If the transmission unit is applied to an automobile, therefore, the fuel consumption ratio can be improved at the same time.

(Second Embodiment)

A toroidal-type continuously variable transmission unit of this embodiment, like the embodiment shown in FIG. 1, comprises an input disc 2, an output disc 3, a loading cam mechanism 6, a power roller 10, a power roller bearing 11, etc. The power roller bearing 11 is composed of an end portion 10b of the power roller 10 that functions as an inner race, a plurality of balls 12, an outer race 13, etc.

The respective surface regions of a raceway groove 15 of the outer race 13 and a raceway groove 16 of the power roller 10 are formed having treated-surface layers 23 and 24 that include residual compression stress layers 23c and 24c (schematically shown in FIG. 7), respectively. The treated-surface layers 23 and 24 that include the residual compression stress layers 23c and 24c are formed by shot-preening the surfaces of the raceway grooves 15 and 16, respectively. These treated-surface layers 23 and 24 that include the residual compression stress layers 23c and 24c individually have residual compression stresses within the range from −20 kgf/mm² to −100 kgf/mm².

Figure 6:
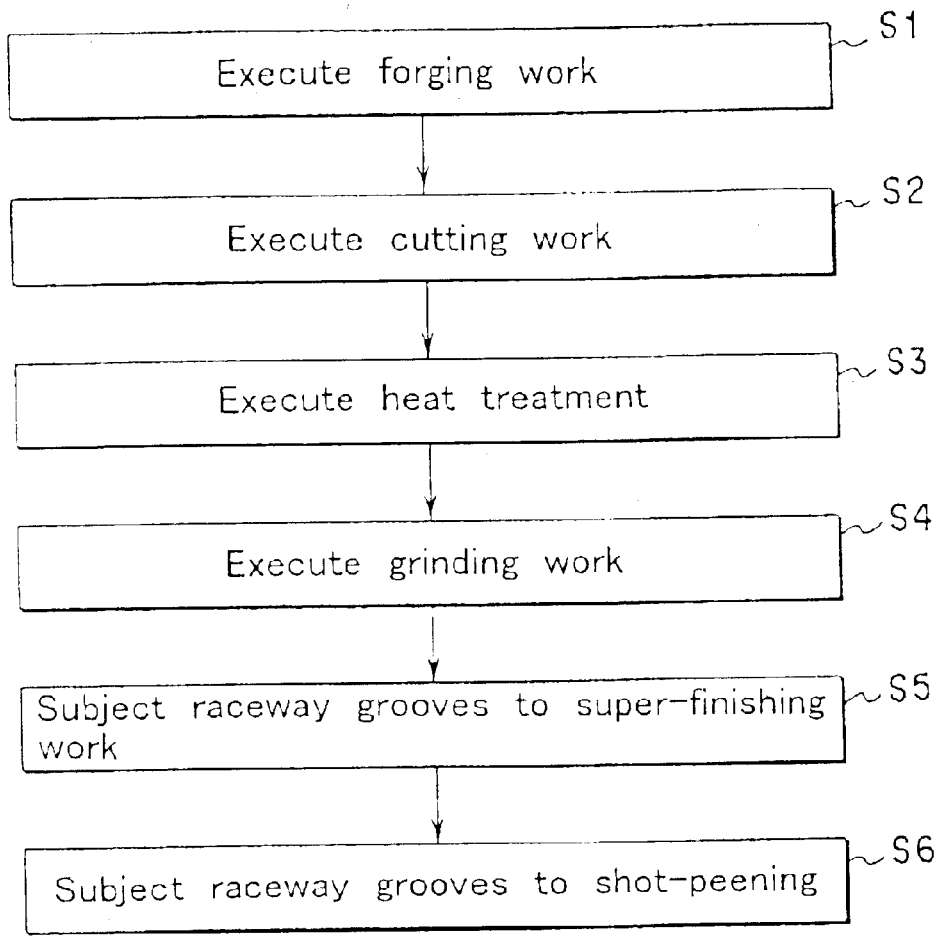
FIG. 6 is a flowchart showing some of manufacturing processes for an outer race and a power roller according to a second embodiment of the present invention.

The outer race 13 and the power roller 10 with the aforementioned configurations are obtained according to the following processes. First, in Step S1 in FIG. 6, a workpiece as a material is forged. After the workpiece is formed into the shape of a nearly finished product by this forging work, the process advances to Step S2. After the workpiece is cut in Step S2, the process advances to Step S3. After the workpiece is subjected to heat treatment such as carburizing treatment or carburizing-nitriding treatment in Step S3, the process advances to Step S4.

After the workpiece is ground into the same shape as a product in Step S4, the process advances to Step S5. After the respective surfaces of the raceway grooves 15 and 16 and the like are subjected to superfinishing work and the like in Step S5, the process advances to Step S6. In Step S6, the respective surfaces of the raceway grooves 15 and 16 and the like are shot-peened to obtain the outer race 13 and the power roller 10 that have desired shapes and the residual compression stress layers 23c and 24c.

Figure 7:
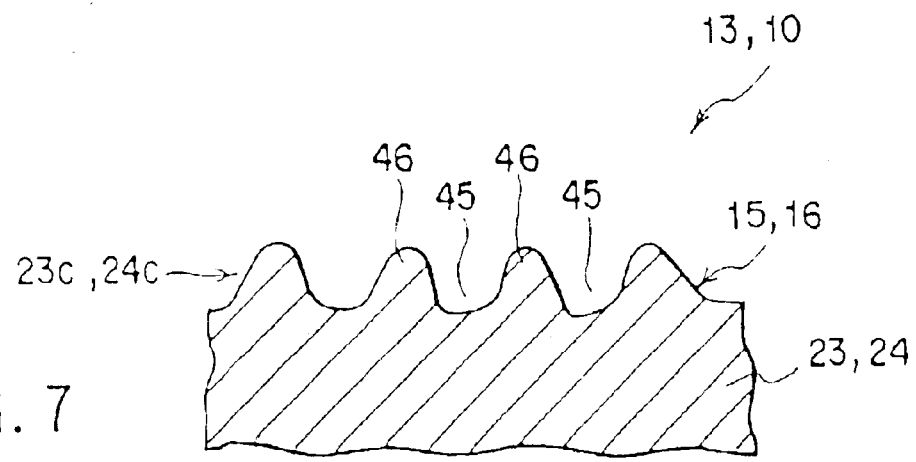
FIG. 7 is an enlarged sectional view schematically showing the surface of a raceway groove of the outer race or the power roller obtained in the manufacturing processes shown in FIG. 6.

As is schematically shown in FIG. 7, depressions 45 and protuberances 46 are formed on the respective surfaces of the raceway grooves 15 and 16, that is, the respective surfaces of the residual compression stress layers 23c and 24c, by shot-preening. Since a lubricant such as traction oil or the lubricative substances described in connection with the first embodiment are held in the depressions 45, the power roller bearing 11 can be prevented from being lubricated unsatisfactorily. Thus, the life of the power roller bearing 11 can be lengthened.

In the present embodiment, shot-preening is carried out in Step S6 after the raceway grooves 15 and 16 are ground in Step S4. Accordingly, the outer race 13 and the power roller 10 can be completed without removing the residual compression stress layers 23c and 24c from the respective surfaces of the raceway grooves 15 and 16 of the outer race 13 and the power roller 10. The residual compression stress layers 23c and 24c serve to ease stress that is generated as the balls 12 roll in the raceway grooves 15 and 16. Thus, the fatigue life of the power roller bearing 11 can be improved.

(Third Embodiment)

Figure 8:
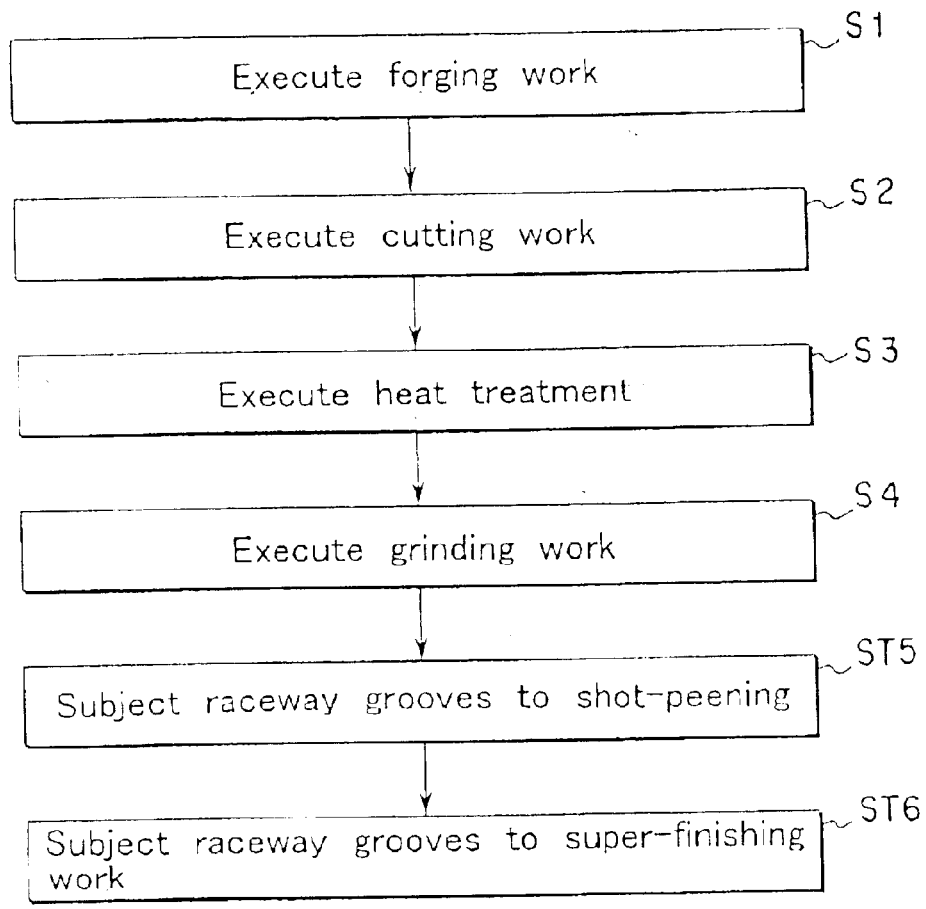
FIG. 8 is a flowchart showing some of manufacturing processes for an outer race and a power, roller according to a third embodiment of the present invention.

FIG. 8 shows processes according to a third embodiment of the present invention that are used to form an outer race 13 and a power roller 10. In the processes shown in FIG. 8, the respective surfaces of raceway grooves 15 and 16 are shot-peened in Step ST5 after cutting work is carried out in Step S4. Thereafter, the respective surfaces of the raceway grooves 15 and 16 are super-finished in Step ST6. In FIG. 8, like symbols are used to designate like processes of FIG. 6, and a description of those processes is omitted.

Figure 9:
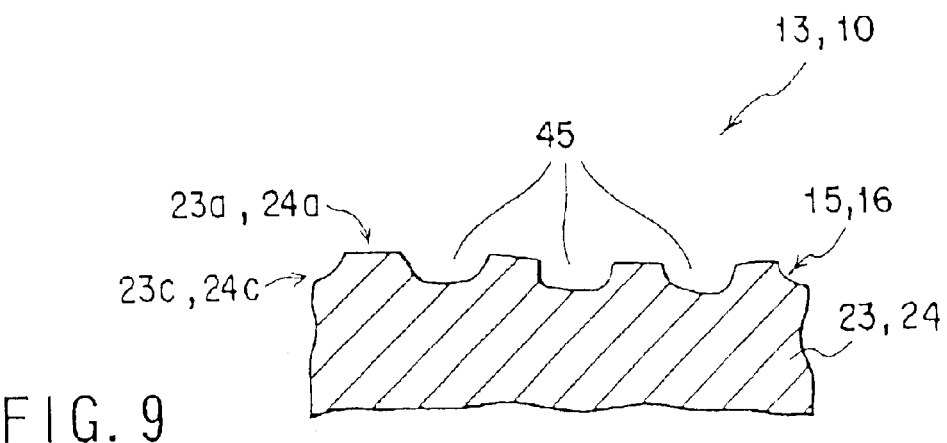
FIG. 9 is an enlarged sectional view schematically showing the surface of a raceway groove of the outer race or the power roller obtained in the manufacturing processes shown in FIG. 8.

If the outer race 13 and the power roller 10 are formed in the processes shown in FIG. 8, residual compression stress layers 23c and 24c and superfinished surfaces 23a and 24a are formed on the respective surfaces of the raceway grooves 15 and 16 as is schematically shown in FIG. 9. More specifically, the protuberances 46 shown in FIG. 7 are removed by super-finishing work (Step ST6), whereupon the depressions 45 remain on the respective surfaces of the residual compression stress layers 23c and 24c. Since the aforesaid lubricant is held in these depressions 45, the power roller bearing 11 can be lubricated satisfactorily. In this case, therefore, the life of the power roller bearing 11 can be lengthened also.

In order to ascertain the function of the power roller bearing 11 according to the present invention, the inventors hereof conducted an endurance test on the toroidal-type continuously variable transmission unit 20 that is provided with the outer race 13 and the power roller 10 described above. TABLE 1 shows results of this test.

TABLE 1

| | Life | Defect |
|---|---|---|
| Invention product A | 100 hours or more | None |
| Invention product B | 100 hours or more | None |
| Invention product C | 100 hours or more | None |
| Comparative example A | 65 hours | Separation of raceway groove surfaces |
| Comparative example B | 68 hours | Separation of raceway groove surfaces |
| Comparative example C | 59 hours | Separation of raceway groove surfaces |

In the test described above, the rotational frequency of the input shaft 1 was set at 4,000 rpm, and input torque from the drive source E at 390 Nm. Further, the endurance test was conducted with use of synthetic traction oil as lubricating oil and with the temperature of this lubricating oil at 100° C.

In Table 1, a product A of the present invention and a product B of the present invention uses outer races and power rollers that were formed individually in the processes shown in FIG. 8. A product C of the present invention uses an outer race and a power roller that were formed in the processes shown in FIG. 6. Comparative examples A, B and C use outer races and power rollers in which the respective surfaces of their raceway grooves were not shot-peened.

According to the test results shown in Table 1, none of the shot-peened products A, B and C of the present invention was broken in a test time of 100 hours. In all of the comparative examples A, B and C, the respective surfaces of the raceway grooves underwent flaking in a test time of about 60 hours.

Thus, power roller bearings 11 of high life performance were able to be obtained in a manner such that the respective surfaces of the raceway grooves 15 and 16 were shot-peened to form the treated-surface layers 23 and 24 including the residual compression stress layers 23c and 24c.

In order to apply a relatively high residual compression stress of, e.g., −100 kgf/mm² to the residual compression stress layers 23c and 24c, shots must be struck hard against the respective surfaces of the raceway grooves 15 and 16. In this case, fine cracks sometimes may be formed in the surfaces of the raceway grooves 15 and 16. These fine cracks can be removed by effecting super-finishing work (Step ST6) after carrying out shot-preening operation (Step ST5) in the processes shown in FIG. 8.

In the second and third embodiments described above, the residual compression stress layers 23c and 24c are formed on both the respective raceway grooves 15 and 16 of the outer race 13 and the power roller 10. Alternatively, however, the residual compression stress layer 23c or 24c may be formed on one of the raceway grooves 15 and 16. In this case, the life of the power roller bearing 11 can be lengthened also. Further, the low-friction layer 25b described in connection with the first embodiment may be formed on the surface of each ball 12. In this case, the residual compression stress layers 23c and 24c is formed on the raceway grooves 15 and 16 by shot-preening. Alternatively, the low-friction layer 23b or 24b may be formed on one of the raceway grooves 15 and 16. In this case, the residual compression stress layer 23c or 24c is formed on the other by shot-preening. Thus, the life of the power roller bearing 11 of the toroidal-type continuously variable transmission unit 20 can be lengthened by forming the treated-surface layers 23 and 24 on at least one of the respective surfaces of the raceway groove 15 of the outer race 13 and the raceway groove 16 of the power roller 10.

It is to be understood, moreover, that any other portions than the raceway grooves 15 and 16 may be shot-peened. The aforesaid residual compression stress layers 23c and 24c may be formed by barreling or the like instead of shot-preening.

The improvement of the rolling fatigue life by the aforesaid shot-preening is also applicable to individual traction surfaces of the toroidal-type continuously variable transmission unit 20. Thus, conditions for these traction surfaces, including high temperature, high speed, high contact pressure, presence of spins, and use of traction oil, etc., are similar to those for the power roller bearing 11. The technique of the present invention is also effective for the traction surfaces. The results of the experiment shown in Table 1 indicate that this technique is also effective for the traction surfaces. More specifically, the life of the discs 2 and 3 or the power roller 10 can be lengthened by shot-preening at least one of the respective traction surfaces of the discs and the power roller.

As is evident from the above description, the power roller bearing of the present invention can be suitably used for a transmission of, for example, a general industrial machine or transportation equipment, as well as a power transmission system of an automobile. The present invention is applicable to full-toroidal-type continuously variable transmission units as well as to half-toroidal-type continuously variable transmission units.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The embodiments of the invention in which an exclusive property or privilege is claimed are defined as follows:

1. A power roller bearing of a toroidal continuously variable transmission unit, which is provided for swinging motion between an input disc capable of being rotated by means of a drive source and an output disc opposed to said input disc, the power roller bearing of the toroidal continuously variable transmission unit comprising:

an outer race;

a power roller in rolling contact with said input disc an output disc; and balls provided for rolling motion between said outer rap and said power roller, said outer race and said power roller having heat-treated and ground annular raceway grooves, respectively, in which said balls roll individually, said raceway grooves being lubricated with a traction oil;

wherein a heat-treated-surface layer is formed in at least one of the raceway grooves of said outer race and said power roller, the heat-treated-surface layer comprising a residual compression stress layer subjected first to super finishing and then to shot-preening, said residual compression stress layer having:

residual compression stress ranging from −20 kgf/mm² to −100 kgf/mm²; and depressions, formed by said shot-preening for holding said traction oil.

\* \* \* \* \*

UNITED STATES PATENT AND TRADEMARK OFFICE
CERTIFICATE OF CORRECTION

PATENT NO. : 6,905,437 B2
DATED : June 14, 2005
INVENTOR(S) : H. Itoh et al.

It is certified that error appears in the above-identified patent and that said Letters Patent is hereby corrected as shown below:

<u>Title page,</u>
*Primary Examiner*, "William C Joyce" should read -- William C. Joyce --.
Item [57], ABSTRACT,
Line 10, "Rad" should read -- Ra --.
Line 16, "preening." should read -- peening. --.

<u>Column 10,</u>
Line 47, "disc an" should read -- disc and --.
Line 49, "rap" should read -- race --.
Line 59, "shot-preening," should read -- shot-peening, --.
Line 64, "shot-preening" should read -- shot-peening --.

Signed and Sealed this

Twenty-fifth Day of October, 2005

JON W. DUDAS
*Director of the United States Patent and Trademark Office*